US010121470B2

(12) United States Patent
Kamalakannan et al.

(10) Patent No.: US 10,121,470 B2
(45) Date of Patent: Nov. 6, 2018

(54) COMPUTER-GENERATED SPEECH DEVICE FOR SITE SURVEY AND MAINTENANCE

(71) Applicant: Honeywell International Inc., Morristown, NJ (US)

(72) Inventors: Arunkumar Kamalakannan, Chennai (IN); Shubhankar Sundriyal, Bangalore (IN); Amit Kulkarni, Plymouth, MN (US); Monica Ravi, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 223 days.

(21) Appl. No.: 14/302,104

(22) Filed: Jun. 11, 2014

(65) Prior Publication Data

US 2015/0364138 A1 Dec. 17, 2015

(51) Int. Cl.
| | |
|---|---|
| *G10L 13/00* | (2006.01) |
| *G10L 15/22* | (2006.01) |
| *G06Q 10/06* | (2012.01) |
| *G06Q 10/10* | (2012.01) |
| *H04W 4/02* | (2018.01) |

(52) U.S. Cl.
CPC ........ *G10L 15/22* (2013.01); *G06Q 10/06311* (2013.01); *G06Q 10/109* (2013.01); *H04W 4/02* (2013.01); *G10L 13/00* (2013.01)

(58) Field of Classification Search
CPC ...................................................... G10L 13/00
USPC .......................................... 704/260, E13.011
See application file for complete search history.

(56) References Cited

U.S. PATENT DOCUMENTS

| 6,574,672 | B1 | 6/2003 | Mitchell et al. | |
|---|---|---|---|---|
| 6,909,921 | B1* | 6/2005 | Bilger | G05B 15/02 |
| | | | | 700/14 |
| 2006/0193262 | A1* | 8/2006 | McSheffrey | H04Q 9/00 |
| | | | | 370/241 |
| 2008/0215462 | A1* | 9/2008 | Sorensen | G06K 9/00771 |
| | | | | 705/28 |
| 2009/0187407 | A1* | 7/2009 | Soble | G06F 19/3487 |
| | | | | 704/260 |
| 2010/0017010 | A1* | 1/2010 | Cote | G05B 19/4184 |
| | | | | 700/110 |
| 2010/0246328 | A1* | 9/2010 | Gudgel | G01S 3/8083 |
| | | | | 367/127 |

(Continued)

OTHER PUBLICATIONS

Extended Search and Opinion from related European patent application No. 15196008.8 dated Oct. 16, 2015, 8 pp.

*Primary Examiner* — Forrest F Tzeng
(74) *Attorney, Agent, or Firm* — Brooks, Cameron & Huebsch, PLLC (57) ABSTRACT

Computer-generated speech devices for site survey and maintenance, and methods of using the same are described herein. One computer-generated speech device includes a location engine to determine a location of the computer-generated speech device at a site, a solution engine to identify an action to perform associated with one of a plurality of nodes at the site using the location of the computer-generated speech device and input data associated with the plurality of nodes, and a speech engine to broadcast the identified action as computer-generated speech using a speaker component of the computer-generated speech device for a user to perform during a survey and/or maintenance of the site.

12 Claims, 3 Drawing Sheets

(56) References Cited

U.S. PATENT DOCUMENTS

| | | | |
|---|---|---|---|
| 2010/0332235 A1* | 12/2010 | David | G06F 17/2785 704/275 |
| 2011/0178969 A1* | 7/2011 | Falchuk | G06N 5/04 706/45 |
| 2012/0309363 A1 | 12/2012 | Gruber et al. | |
| 2013/0155904 A1* | 6/2013 | Dokania | H04B 1/7183 370/255 |
| 2015/0048954 A1* | 2/2015 | Caicedo Fernandez | G08C 15/06 340/815.45 |
| 2017/0024986 A1* | 1/2017 | Austin | G08B 21/12 |

* cited by examiner

COMPUTER-GENERATED SPEECH DEVICE FOR SITE SURVEY AND MAINTENANCE

TECHNICAL FIELD

The present disclosure relates to computer-generated speech devices for site survey and maintenance, and methods of using the same.

BACKGROUND

Nodes can be placed at various places at a site (e.g., a building, a compound, facility, building, area, etc.) to form a network, which can distribute data and/or collect data. A node can include a radio frequency (RF) device, a sensor, a wireless router, and/or a camera, for example. A field engineer carrying a device can survey and maintain the network by visiting the site for periodic maintenance and/or to resolve an issue. For instance, a field engineer can carrying a device with an application that displays a list of live and historical events once the device is connected to the network.

In various instances, the device can display many events at once. It can be confusing to the field engineer as to which event to address, where to start, and/or how to organize the various events. The field engineer may select an event to work on first based on their own preference, such as knowledge that user may have, time, and/or event type. The field engineer may, in some instances, not know the root cause of the event and may resolve the event based on their own knowledge. This can result in loss of productivity and increased inaccuracy. Further, the field engineer may not know how to reach a node associated with the event.

DETAILED DESCRIPTION

Computer-generated speech devices for site survey and maintenance, and methods of using the same are described herein. For example, one or more computer-generated speech devices for site survey and maintenance can include a location engine to determine a location of the computer-generated speech device at a site, a solution engine to identify an action to perform associated with one of a plurality of nodes at the site using the location of the computer-generated speech device and input data associated with the plurality of nodes, and a speech engine to broadcast the identified action as computer-generated speech using a speaker component of the computer-generated speech device for a user to perform during a survey of the site and/or during maintenance activities at the site.

As discussed herein, nodes can be placed at various places at a site (e.g., an area) to distribute data and/or collect data. For example, a wireless router can be placed at the site to distribute and/or collect data, a sensor (e.g., smoke detector) can be placed at the site to collect data (e.g., data associated with a fire), and/or a camera can be placed at the site to collect images for use in security monitoring. The nodes can be placed throughout the site for proper distribution and/or collection of data. If one or more of the nodes have an issue (e.g., an event), data collection at the site can be disrupted and/or not collected for a portion of the site.

A field engineer team can be used for periodic maintenance of the network of nodes and/or to respond to an event. The nodes can be installed in particular positions according to a network topology. The network topology can include a defined layout of a network of nodes, for example. A field engineer associated with the field engineer team (e.g., a user) can survey the area and/or perform maintenance on the node network using a device with an application that can assist in addressing events and/or for general troubleshooting.

However, in some instances, a device with an application for surveying a site can display a plurality of events at once. The user may have a difficult time determining which event to work on first, how to reach a node associated with the event, and/or what order to work on the plurality of events. The user may select which event to work on and/or an order to work on the events based on their own preferences. For instance, the user may select to work on an event that they have knowledge on how to resolve, that they know where the node is located, that the node is closest to where the user is located, etc.

Further, the user may not know a root cause of one or more of the events. The user may attempt to resolve the event based on assumptions. Processing the events based on preference and/or assumptions can lower productivity and/or decrease accuracy of the user in resolving events and/or maintaining the network.

In addition, a user may have difficulty viewing information on the device without speech capabilities while performing their duties to maintain the network. For instance, the location of a node may require the user to climb a ladder to reach the node. The user may have to store the device while moving to the location of the node and may subsequently have to stop to relook at the device to determine how to reach the node. This can increase the time it takes a user to perform routine maintenance and/or resolve an event (e.g., an issue or failure of one or more nodes in the network).

Embodiments of the present disclosure include computer-generated speech devices and methods of using the same for site survey and maintenance that improves efficiency and increases accuracy as compared to previous approaches. A computer-generated speech device, in accordance with one or more embodiments, can include a location engine, a solution engine, and a speech engine. The location engine can determine a location of the user at a site based on the location of device and/or can determine a location of nodes at the site. The solution engine can identify events at the site, prioritize the events, and determine directions to a location of one or more of the events. The speech engine can broadcast computer-generated speech to inform a user of the event (e.g., that is prioritized) and/or directions to guide the user to the location of the event using a speaker component of the computer-generated speech device.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" refers to one or more. For example, "a number of nodes" can refer to one or more nodes.

Figure 1:
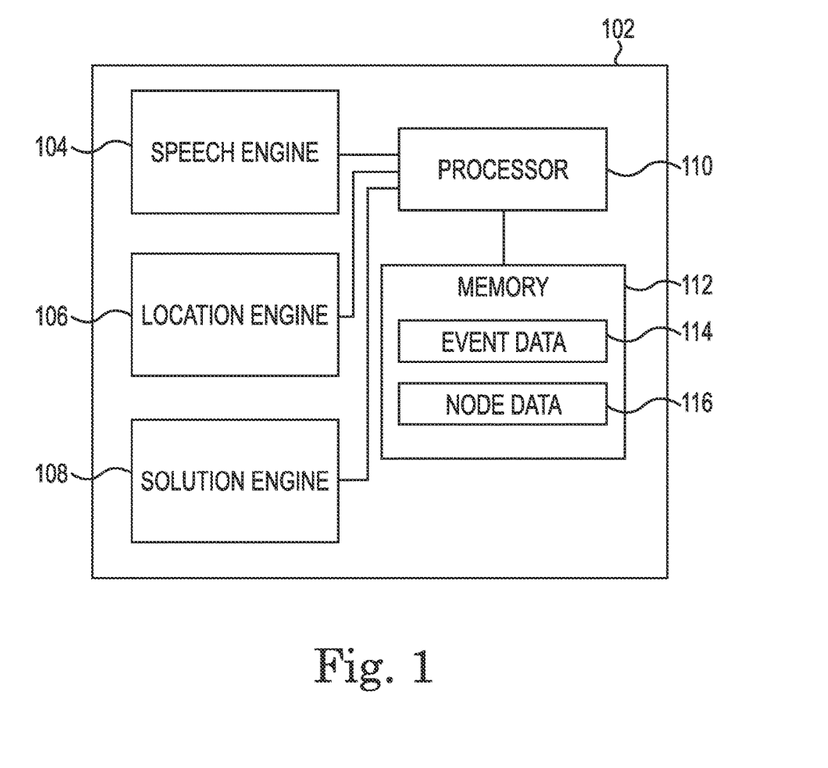
FIG. 1 illustrates an example of a computer-generated speech device in accordance with one or more embodiments of the present disclosure.

FIG. 1 illustrates an example of a computer-generated speech device 102 in accordance with one or more embodiments of the present disclosure.

The computer-generated speech device 102 can be used to identify nodes at a site that have an event associated with them and may require maintenance. The identification of the potentially problematic node can occur and/or be resolved during a survey of the site using the computer-generated speech device 102 by a user. A user can include, for instance, a member of a field engineer team (e.g., a field engineer), a contractor, and/or other person associated with the field engineer team.

As illustrated by FIG. 1, the computer-generated speech device 102 can include a memory 112 and a processor 110 coupled to the memory 112. The memory 112 can be any type of storage medium that can be accessed by the processor 110 to perform various examples of the present disclosure. For example, the memory 112 can be a non-transitory computer readable medium having computer readable instructions (e.g., computer program instructions) stored thereon that are executable by the processor 110 to perform various examples of the present disclosure.

The memory 112 can be volatile or nonvolatile memory. The memory 112 can also be removable (e.g., portable) memory, or non-removable (e.g., internal) memory. For example, the memory 112 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory. Further, the memory 112 can be located in the computer-generated speech device 102, or internal to another computing component (e.g., enabling computer readable instructions to be downloaded over the Internet or another wired or wireless connection).

As illustrated by FIG. 1, data can be input and stored on the memory 112. The input data can include, for instance, event data 114 and/or node data 116. Event data 114, as used herein, can be data of current (e.g., unresolved) and/or past (e.g., resolved or unresolved) events. For example, event data 114 can include identification of an event (e.g., issue) and/or nodes associated with the event at the site.

Node data 116, as used herein, can be data related to functionality of nodes at the site. For instance, the node data 116 can include historical (e.g., past values) and current (e.g., current values) data. Example node data 116 can include signal strength (RF values and/or received signal strength indicator (RSSI)), channel interferences, past events, past maintenance, etc. In some embodiments, the node data 116 can be stored in a node database on the computer-generated speech device 102.

In various embodiments of the present disclosure, the computer-generated speech device 102 can include one or more input devices. A user may enter commands and information into the computer-generated speech device 102 through the input devices. Example input devices can include a keyboard, mouse and/or other point device, touch screen, microphone, joystick, game pad, scanner, wireless communication, etc. The input devices can be connected to the computer-generated speech device 102 through an interface, such as a parallel port, game port, or a universal serial bus (USB). A monitor or other type of display device can also be connected to the system via an interface, such as a video adapter. The monitor can display graphical user information for the user.

In some embodiments, the memory 112 and the processor 110 can be a portion of the engines (e.g., the speech engine 104, the location engine 106, and the solution engine 108). An engine, as used herein, can include a combination of hardware and programming that is configured to perform a number of functions described herein. That is, the hardware and/or programming of the engine used to perform the number of functions can include the memory 112 and the processor 110. Alternatively, one or more of the engines can include hardware and/or programming that is separate from the memory 112 and the processor 110. For example, one or more engines can include a separate processor and/or memory, and/or can include logic to perform the number of functions described herein. In various instances, the separate processor and/or memory can be remotely located and can communicate with the computer-generated speech device 102 using a communication system (e.g., the Internet and/or other network).

The location engine 106 can include a combination of hardware and programming to determine a location of the computer-generated speech device 102 at a site. For example, using input data, such as a map of the site and a signal from the computer-generated speech device 102, the location engine 106 can determine a location of the computer-generated speech device 102. The signal from the computer-generated speech device 102 can include one or more wireless signals, a global positioning system (GPS signal), and/or a radio frequency (RF) signal, among other communication signals.

A map of the site can be input to the computer-generated speech device 102, in various embodiments. The site can include an indoor area (e.g., a home, a building, a tunnel system), and/or an outdoor area (e.g., a facility, a multiple building complex, etc.), among other sites. The map can include a map in an object readable format (e.g., a computer-aided design (CAD) file, a Building Information Model (BIM) format), a map in a raster format (e.g., image/Joint Photographic Experts Group (JPEG) format), and/or a map in three-dimensions among other formats. The map can, for instance, be stored as node data 116 and/or used to create at least some node data 116, as discussed further herein.

For example, in some embodiments, the location engine 106 can determine a location of a number of nodes at the site using the input data. The input data can include the map and/or other site information that includes identification of the nodes at the site.

The solution engine 108 can include a combination of hardware and programming to identify an action to perform associated with a node among a plurality of nodes at the site using the location of the computer-generated speech device and input data associated with the plurality of nodes. The action can, for instance, include an action for the user to perform while surveying the site and/or during network maintenance.

For example, the action can include an event to resolve and/or a direction to a node associated with the event. An event, as used herein, can include an issue associated with one or more nodes of the network. The event can include an unresolved event. That is, the event can be currently occurring when the user is located at the site. The direction can include guidance for the user to move from the current location to the location of the event at the site.

The speech engine 104 can include a combination of hardware and programming to broadcast the identified action as computer-generated speech using a speaker component of the computer-generated speech device 102 for a user to perform during a survey of the site and/or during network maintenance. For instance, the speech engine 104 can convert the identified action to computer-generated speech.

Converting the identified action to computer-generated speech can include processing computer-readable instructions (e.g., code) to computer-generated speech. Computer-generated speech can include computer-readable instructions that when executed can be broadcast, by a speaker component, such that a human (e.g., the user) can understand the broadcast. That is, broadcasting of the computer-generated speech can include artificial production of human speech as a message to the user.

The speech engine 104 can broadcast the converted computer-generated speech using a speaker component of the computer-generated speech device 102 for a user to perform during the survey of the site and/or during network maintenance. A speaker component, as used herein, include an electroacoustic transducer that produces sound (e.g., artificial human speech generated by the computer-generated speech device 102) in response to an electrical audio signal input (e.g., the computer-generated speech).

As an example, the solution engine 108 can identify an event associated with a node among the plurality of nodes using input data associated with the node, and determine directions to reach the node using the determined location of the computer-generated speech device 102 and the determined location of the node. The speech engine 104 can convert the identified event and determined directions to computer-generated speech, and broadcast the computer-generated speech using a speaker component of the computer-generated speech device 102.

In accordance with some embodiments, the solution engine 108 can identify a plurality of events. In such embodiments, the solution engine 108 can prioritize the plurality of events in response to the identification. The prioritization can occur using input data associated with the nodes (e.g., node data 116 and/or event data 114). For example, the input data can include event data 114, node data 116 (e.g., historical node data and/or current node data), a location of the computer-generated speech device 102, and/or a location of each node associated with an event among the plurality of events.

The prioritization of the plurality of events based on input data can include prioritizing and sequencing an order to process the events based on criticality of the event, the event/node location, etc. An event among the plurality of prioritized events can be converted from computer-readable instructions to computer-generated speech via the speech engine 104. The event can include a highest priority event among the plurality of prioritized events. The prioritization of events can assist the user in addressing the events in an organized manner and to improve productivity as compared to previous solutions.

The speech engine 104 can subsequently convert and broadcast the remaining prioritized events to the user. For instance, in response to an input from the user indicating the event is resolved and/or determining the event is resolved (as discussed below), the speech engine 104 can convert computer-readable instructions associated with a second event among the plurality of prioritized events to computer-generated speech and broadcast the computer-generated speech using the speaker component of the computer-generated speech device 102 to inform the user of the second event. The broadcast can include a wired and/or wireless broadcast. This can be repeated, for instance, until all events are resolved and/or until the computer-generated speech device 102 is not located at the site and/or disconnects from the communication system.

In some embodiments, the speech engine 104 can broadcast multiple computer-generated speech messages (e.g., as artificial human speech) for a single event. For instance, the speech engine 104 can broadcast the computer-generated speech using a speaker component of the computer-generated speech device 102 to inform a user of the event and broadcast directions to a location of the event as computer-generated speech using the speaker component to guide the user to the location.

Broadcasting directions to a location of the event, in various embodiments, can include multiple messages to guide the user to a location of a node associated with the event. The multiple messages can be broadcast as the user moves throughout the site and the location of the computer-generated speech device 102 changes.

In some embodiments, the solution engine 108 can identify an event that occurs (e.g., newly occurs) while the user is surveying the site and/or performing maintenance activities (e.g., troubleshooting and/or diagnosing network at the site). For instance, the solution engine 108 can identify an event created by the activity of the user while at the site and/or when an event occurs. The speech engine 104 can convert the identified event to computer-generated speech and broadcast the computer-generated speech using the speaker component.

The event (e.g., a new event) can include an event created by the user's action and/or an event with a priority that is outside a threshold priority (e.g., is a critical event to be addressed). The new event identified can result in an alert to immediately inform the user of the new event.

For instance, the computer-generated speech device 102 can generate an alert. An identified event can include a new event (e.g., an event that occurs while the user is at the site and/or because of actions of the user) with a priority that is outside a threshold priority.

As an example, the solution engine 108 can identify the new event and determine (e.g., calculate) a priority of the new event. In response to the priority of the new event being outside a threshold priority (e.g., above or below), an alert can be broadcast as computer-generated speech. The alert can include a message with identification of the new event that is broadcast as artificial human speech. That is, the solution engine 108 can identify a new event is outside a threshold priority and can generate an alert. The speech engine 104 can convert the generated alert to computer-generated speech and can broadcast the computer-generated speech. The alert can result in the user being informed of the event and help ensure the user can give attention to the event while at the site.

In some embodiments, the solution engine 108 can identify a plurality (e.g., multiple) of events that occur while the user is at the site and can prioritize the plurality of events based on event data 114 and/or node data 116. For example, the solution engine 108 can identify a first event and a second event, and can prioritize the first event as a higher priority than the second event based on event data 114 and/or node data 116. The speech engine 104 can convert the first event and directions to reach the first event to computer-generated speech, and broadcast the computer-generated speech using the speaker component.

In some embodiments, the solution engine 108 can determine that an event is resolved. The determination can be based on the input from the user and/or based on node data 116. For instance, the node data 116 can include current parameter values (e.g., parameters such as signal strength, on-line/off-line indication, channel interference, etc.) of the nodes. The node data 116 and/or other data can be used to determine normalization of parameters of one or more nodes and/or resolution of the event. The input from the user can include, for instance, a speech command, an input to a touch screen (e.g., clicking using a finger), and/or a keystroke, among other inputs.

In some embodiments, the computer-generated speech device 102 can include a speech recognition engine and/or a microphone component (not illustrated by FIG. 1). The speech recognition engine can include a combination of hardware and programming to process a speech command received using a microphone component of the computer-generated speech device 102.

A microphone component, as used herein, can be an acoustic-to-electric transducer or sensor that converts sound (e.g., a speech command) in air into an electrical signal. The microphone component can be used to capture one or more speech commands from a user. The speech recognition engine can process the speech command (e.g., the converted electrical signal from the speech command) to computer-readable instructions that can be executed by the computer-generated speech device 102.

For example, a user can query the computer-generated speech device 102 to see what happened and/or what caused the event using a speech command (e.g., a spoken command). The speech recognition engine can process the speech command. Processing the speech command can include converting the speech command to computer-readable instructions. The solution engine 108 can determine a root cause (as further discussed herein) of the event in response to the processed speech command. Identifying a root cause can be used to resolve multiple dependent events, for instance.

The computer-generated speech device 102, as illustrated by FIG. 1, can be used to perform a number of methods. An example method can include identifying a plurality of events at a site, wherein each of the plurality of events are associated with a node among a plurality of nodes at the site. The method can include prioritizing the plurality of events at the site using input data associated with the nodes and converting computer-readable instructions associated with an event among the plurality of prioritized events to computer-generated speech. Further, the method can include broadcasting the computer-generated speech using a speaker component of the computer-generated speech device to inform a user of the event and broadcasting directions to a location of the event as computer-generated speech using the speaker component to guide the user to the location. Although example methods in accordance with embodiments of the present disclosure are not so limited and can include a variety of methods of use.

The computer-generated speech device 102 illustrated by FIG. 1 can allow a user to perform maintenance on a network using a hands-free and eye-free device that can be located on the user. By allowing the device 102 to be hands-free, eyes-free, and located on the user, the user can perform maintenance actions at the site without handling the computer-generated speech device 102.

For example, the user can receive messages (e.g., artificial human speech) from the computer-generated speech device 102 without having to stop their current activity (such as climbing a ladder to reach a node or diagnostic actions). Further, the user does not need to look from the nodes to the computer-generated speech device 102 to read responses from the nodes. And, the computer-generated speech device 102 can provide the user with a prioritized order of resolving events to increase productivity as compared to previous solutions.

Figure 2:
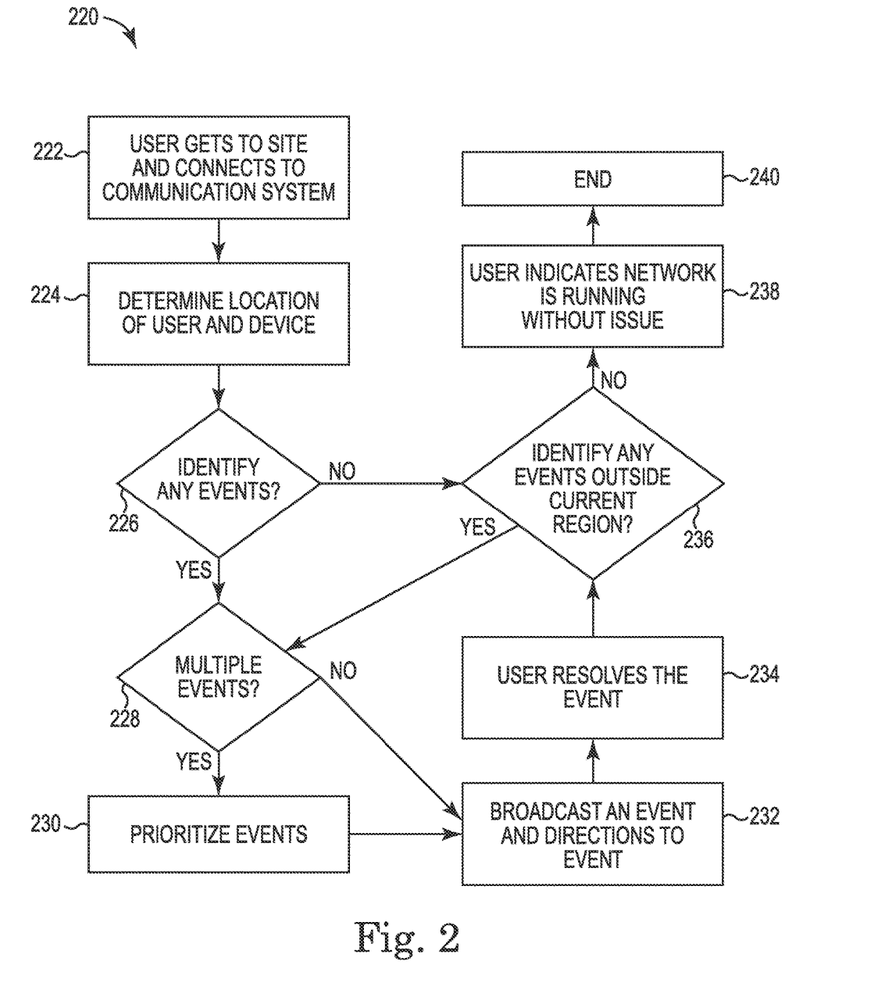
FIG. 2 illustrates a flow diagram of an example of a process for surveying and/or performing maintenance activities at a site using a computer-generated speech device in accordance with one or more embodiments of the present disclosure.

FIG. 2 illustrates a flow diagram of an example of a process 220 for surveying and/or performing maintenance activities at a site using a computer-generated speech device in accordance with one or more embodiments of the present disclosure. The computer-generated speech device 102 illustrated in FIG. 1 can be used to perform the process 220, for example. The process 220 can be used to perform a hands-free and eyes-free survey of a network of nodes by a user.

At block 222, the user may reach the site and can connect the computer-generated speech device to a communication system. The communication system can include a network system (e.g., Internet, cloud system, etc.).

The computer-generated speech device can include a mobile device such as a laptop, a tablet, and/or a cellular telephone, among other devices, that can be carried by the user. For instance, the computer-generated speech device can be carried hands-free by the user, such as by attaching to a belt and/or carrying in a pocket, among other places.

Upon connecting to the communication system, at block 224, the computer-generated speech device can determine the location of the user and the computer-generated speech device. The determination can be based on inputs, such as a map of the site and/or a communication signal from the computer-generated speech device.

The map of the site can be imported to the computer-generated speech device. The map of the site can include coordinates. Coordinates can include real world coordinates to give the map dimensions and locations. Dimensions and locations can include two-dimensional (2D) and/or three-dimensional (3D) coordinates (e.g., measurements) of regions of the site, elements, and/or objects associated with the site, such as nodes.

For example, the height, altitude, and/or depth of a node can be important in some context. In some instances, the map can include a 3D map and/or 3D coordinates. That is, the map can include an x-axis, a y-axis, and a z-axis (e.g., for depth). In such an instance, the map can include coordinates added to the map that include the x-axis values, y-axis values, and z-axis values.

At block 226, the computer-generated speech device can identify any events in the current region of the site. For example, in some embodiments, the site can be separated into a plurality of regions. A region, as used herein, can include a sub-portion of the site. The current region can include the region of the site that the user/computer-generated speech device is located in. Example regions of a site can include different buildings of the site, different floors or zones of a factory, etc.

The identification can be based on the location of the user and the device, as well as the location of the nodes in the current region. In response to not identifying any events, at block 236, the computer-generated speech device can identify if any events are in the network outside of the current region, as further discussed herein.

In response to identifying one or more events, at block 228, the computer-generated speech device can determine if there are multiple events in the current region. At block 230, in response to identifying multiple events, the computer-generated speech device (e.g., the solution engine) can prioritize the multiple events based on event type, severity, etc., in a manner analogous to that previously described in connection with FIG. 1.

At block 232, the computer-generated speech device (e.g., the speech engine) can broadcast an event and directions to the event. The event can include an event (e.g., an unresolved event) among the multiple events with the highest priority and/or, in some embodiments, can include the only event identified in the current region (e.g., in response to not identifying multiple events at block 228).

The broadcast can inform the user using artificial human speech about the event that the user can address first. The broadcast of the event can include the event type, node address and/or label, etc., that is artificial human speech so that the user does not need to physically look at the computer-generated speech device to receive the message.

The broadcast of the directions to the event, in a number of embodiments, can include the computer-generated speech device guiding the user to where the node is located and/or how to reach the location based on the map. The broadcast of the directions can include a plurality of broadcasts to guide the user to the location as the user moves through the site.

As an example, the site can include an industrial plant, such as a refinery. The map can include many structural elements such as pipes, columns, stacks, buildings, and stairs. The directions to the event can include a broadcast message to climb stairs, which the user can climb the stairs as receiving the message, while the device is stored on the user. That is, the broadcast of the computer-generated speech can allow a user to receive instructions hands-free and eyes-free such that the user is not inhibited by the device to perform maintenance.

At block 234, once the user reaches the location of the event, the user can resolve the event. The computer-generated speech device can be notified of the resolution of the event by an input by the user (e.g., speech command and/or other input), by automatic updates from the nodes (e.g., the network) towards the computer-generated speech device, and/or by current node data indicating the event is resolved (e.g., parameters have normalized).

In response to the user resolving the event (e.g., at block 234) and/or not identifying any event in the region (e.g., at block 226), the computer-generated speech device can identify if there are any events outside the current region at the site, at block 236. In response to identifying an event outside the current region, the computer-generated speech device can determine if there are multiple events in a particular region and/or the site, at block 228; can prioritize the multiple events, at block 230; can broadcast an event and directions to the event, at block 232; and, in response to the user resolving the event, at block 234, can determine if any events are outside the current region, at block 236. This process can be repeated until the computer-generated speech device does not recognize an event at the site and/or until the user leaves the site (e.g., out of time, end of day, more urgent event at a different site, etc.).

For example, the solution engine of the computer-generated speech device can identify if there is an event outside the current region of the site. In response to an identified event outside of the current region, the solution engine can determine directions to reach a node associated with the event outside the current region using the determined location of the computer-generated speech device and the determined location of the node.

In response to not identifying an event outside the current region, the user can indicate the network is running without issue, at block 238. The indication can include a speech command and/or other input, for example. For instance, the user can ensure the complete network is up and running without issue using an input to the computer-generated speech device. And, in response to the indication, at block 240, the process 220 can end.

Figure 3:
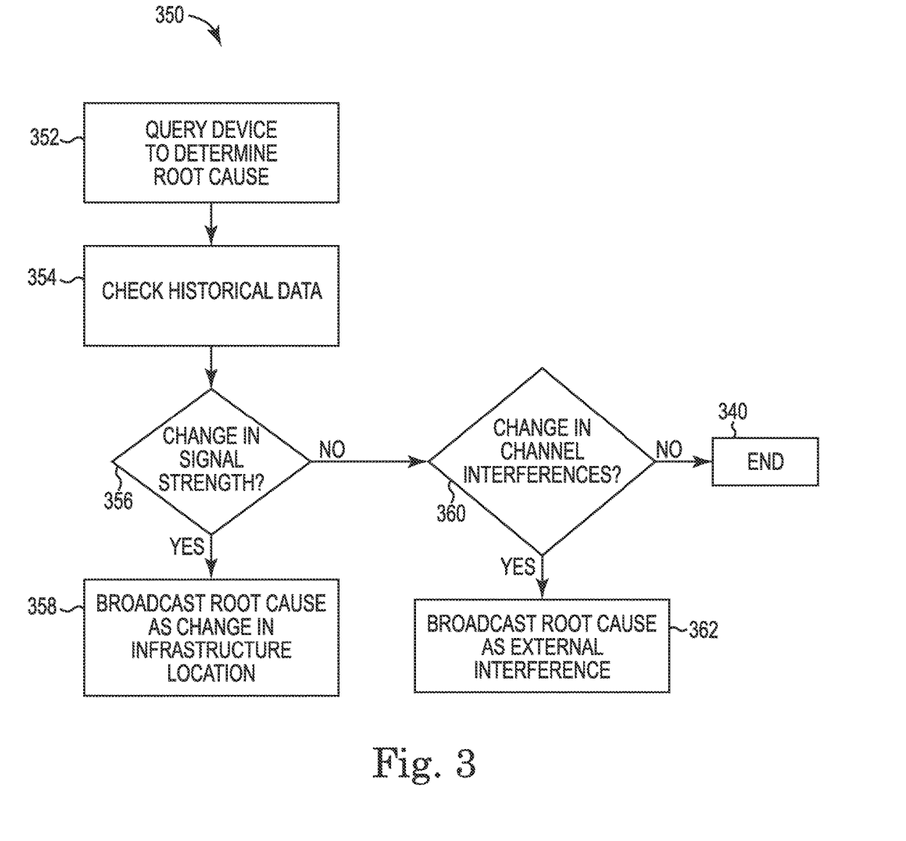
FIG. 3 illustrates a flow diagram of an example of a process for resolving an event using a computer-generated speech device in accordance with one or more embodiments of the present disclosure.

FIG. 3 illustrates a flow diagram of an example of a process 350 for resolving an event using a computer-generated speech device in accordance with one or more embodiments of the present disclosure. The computer-generated speech device 102 illustrated in FIG. 1 can be used to perform the process 350, for example. Further, the process 350 illustrated in FIG. 3 can be the same "resolution of an event" at block 234 as illustrated by the process 220 in FIG. 2, in various embodiments.

At block 352, the user can query the computer-generated speech device to determine a root cause of an event. A root cause, as used herein, can include what caused the event and/or what happened. The query can include, in various embodiments, a speech command. That is, the user can query the computer-generated speech device using a hands-free and eyes-free solution.

At block 354, the computer-generated speech device (e.g., the solution engine) can check historical data. The historical data can include event data and/or node data.

At block 356, the computer-generated speech device can identify if there is a change in signal strength based on the historical data. For example, the solution engine, in response to a processed speech command, can identify if there is a change in signal strength (e.g., RSSI values) between historical data and current data of the node (e.g., node data) involved and/or associated with the event. The change can include a threshold change in signal strength (e.g., RSSI value) between the particular node's immediate links during a particular period of time and/or after a particular period of time (e.g., the time of the event).

In response to identifying a change in signal strength, the computer-generated speech device (e.g., the solution engine) can determine the root cause of the event is a change in infrastructure at a particular location. And, at block 358, the computer-generated speech device (e.g., the speech engine) can convert the determined root cause to computer-generated speech and broadcast the computer-generated speech using the speaker component of the computer-generated speech device.

In response to not identifying a change in signal strength (e.g., a threshold change in signal strength), at block 360, the computer-generated speech device can identify if there is a change in channel interference between historical data and current data of a node involved and/or associated with the event. The change in channel interference can include a threshold change between channel interference values of the particular node during a particular period of time and/or after a particular period of time.

In response to identifying a change in channel interference, the computer-generated speech device (e.g., the solution engine) can determine the root cause of the event is an external system (e.g., an RF system) interfering at the same channel as the node. And, at block 362, the computer-generated speech device (e.g., the speech engine) can convert the determined root cause to computer generated speech and broadcast the computer-generated speech using the speaker component of the computer-generated speech device.

In response to not identifying a change in channel interference (e.g., not identifying a threshold change), the process 350 can end at block 340. The end of the process 350 can include the end of the process 220 as illustrated in FIG. 2, in various embodiments.

Any of the above information, data, and/or images can be saved along with the plurality of images as metadata and/or a data file which can be available for later image processing and/or other purposes.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computer-generated speech device for site survey and/or maintenance, comprising:
   a location engine to determine a location of the computer-generated speech device at a site;
   a solution engine to:
   identify, using input data, a plurality of events associated with a plurality of nodes that form a network at the site that require maintenance, wherein the site includes a plurality of regions;
   prioritize the plurality of events based on level of criticality, region, and number of events in each region, select an event based on the criticality, the region, and the number of events in each region, and determine directions to guide a user to the event selected;
   identify an action for a user to perform during a survey and/or maintenance of the site associated with one of the plurality of nodes at the site using the location of the computer-generated speech device and input the data associated with the plurality of nodes;
   identify a new event that has not been previously a part of the plurality of events, wherein the new event occurs during the survey and/or maintenance of the site and prioritize the plurality of events including the new event;
   a speech engine to broadcast the identified action as computer-generated speech using a speaker component of the computer-generated speech device for the user to perform during the survey and/or maintenance of the site and to broadcast an alert in response to the priority of the new event; and
   a speech recognition engine to process a speech command to determine root cause of the event, received using a microphone component of the computer-generated speech device, wherein the solution engine, in response to the processed speech command, identifies if there is a change in a signal strength between historical data and current data of a node of the plurality of nodes and in response to identifying the change in the signal strength, determines the root cause of the event is a change in infrastructure, and in response to not identifying the change to the signal strength, identifies if there is a change in channel interference between the historical data and the current data of the node and in response to identifying there is a change in channel interference, determines the root cause of the event is an external system interfering at the same channel as the node.

2. The computer-generated speech device of claim 1, wherein the location engine further determines a location of the number of nodes at the site using the input data.

3. The computer-generated speech device of claim 1, wherein the broadcast of the identified action further includes the speech engine to convert the identified action to computer-generated speech.

4. The computer-generated speech device of claim 1, wherein:
   the solution engine identifies an event created by the activity of the user while at the site; and
   the speech engine broadcast the identified event as computer-generated speech using the speaker component.

5. The computer-generated speech device of claim 1, wherein:
   the solution engine:
   identifies a first event and a second event; and
   prioritizes the first event as a higher priority than the second event based on event data; and
   the speech engine broadcasts the first event and directions to a location of the first event as computer-generated speech using the speaker component.

6. A method for surveying and/or maintaining a site using a computer-generated speech device, comprising:
   identifying, using input data, a plurality of events associated with a plurality of nodes that form a network at a site that require maintenance, wherein the site includes a plurality of regions;

prioritizing the plurality of events at the site based on level of criticality, region, and number of events in each region, using input data associated with the plurality of nodes and selecting an event based on the criticality, the region, and the number of events in each region;

identifying a new event that has not been previously a part of the plurality of events, wherein the new event occurs during the survey and/or maintenance of the site and prioritizing the plurality of events including the new event;

converting computer-readable instructions associated with the selected event among the plurality of prioritized events to computer-generated speech;

broadcasting the computer-generated speech using a speaker component of the computer-generated speech device to inform a user of the selected event;

broadcasting an alert in response to the priority of the new event;

broadcasting directions, based on the plurality of prioritized events, to a location of the selected event as computer-generated speech using the speaker component to guide the user to the location; and processing a speech command to determine root cause of the event, received using a microphone component of the computer-generated speech device, in response to the processed speech command, identifying if there is a change in a signal strength between historical data and current data of a node of the plurality of nodes and in response to identifying the change in the signal strength, determining the root cause of the event is a change in infrastructure, and in response to not identifying the change to the signal strength, identifying if there is a change in channel interference between the historical data and the current data of the node and in response to identifying there is a change in channel interference, determining the root cause of the event is an external system interfering at the same channel as the node.

7. The method of claim 6, wherein prioritizing the plurality of events includes using at least one of event data, historical node data, current node data, a location of the computer-generated speech device, and a location of each node associated with the event among the plurality of events.

8. The method of claim 6, including:
converting computer-readable instructions associated with a second event among the plurality of prioritized events to computer-generated speech in response to an input indicating the event is resolved; and
broadcasting the computer-generated speech using the speaker component of the computer-generated speech device to inform the user of the second event.

9. The method of claim 8, including determining the event is resolved based on the input, wherein the input includes at least one of a speech command from the user and automatic updates from the nodes towards the computer-generated speech device.

10. A computer-generated speech device for site survey, comprising:
a location engine to:
determine a location of the computer-generated speech device at a site, wherein the site includes a plurality of regions; and
determine a location of a plurality of nodes at the site;
a solution engine to:
identify an event, among a plurality of events, wherein the event is associated with a node among the plurality of nodes using input data associated with the node;
prioritize the plurality of events based on level of criticality, region, and number of events in each region and select an event based on the prioritization;
identify a new event that has not been previously a part of the plurality of events, wherein the new event occurs during the survey and/or maintenance of the site and prioritize the plurality of events including the new event; and
determine directions to guide a user to the node associated with the selected event using the determined location of the computer-generated speech and the determined location of the node;
a speech engine to:
convert the identified event and determined directions to computer-generated speech; and
broadcast the computer-generated speech and an alert in response to the priority of the new event using a speaker component of the computer-generated speech device; and
a speech recognition engine to process a speech command to determine root cause of the event, received using a microphone component of the computer-generated speech device, wherein the solution engine, in response to the processed speech command, identifies if there is a change in a signal strength between historical data and current data of a node of the plurality of nodes and in response to identifying the change in the signal strength, determines the root cause of the event is a change in infrastructure, and in response to not identifying the change to the signal strength, identifies if there is a change in channel interference between the historical data and the current data of the node and in response to identifying there is a change in channel interference, determines the root cause of the event is an external system interfering at the same channel as the node.

11. The computer-generated speech device of claim 10, wherein
the speech engine:
converts the determined root cause to computer-generated speech; and
broadcasts the computer-generated speech using the speaker component of the computer-generated speech device.

12. The computer-generated speech device of claim 10, where the solution engine:
identifies an event outside a current region of the site; and
in response to the identified event outside the current region, determines directions to a node associated with the event outside the current region using the determined location of the computer-generated speech device and the determined location of the node.

* * * * *